Patented Apr. 18, 1950

2,504,270

UNITED STATES PATENT OFFICE 2,504,270

METHOD OF PREPARING POLYETHYLENE WAX COMPOSITIONS

Frederick H. MacLaren, Munster, Ind., and John A. Anderson, Chicago, Ill., assignors to Standard Oil Company, Chicago, Ill., a corporation of Indiana No Drawing. Application May 29, 1947, Serial No. 751,462

4 Claims. (Cl. 260—28.5)

This invention relates to improved petroleum wax compositions, and more particularly relates to stable homogeneous high tensile strength paraffin wax compositions containing high molecular weight ethylene polymers and the method of preparing such wax compositions.

The use of high molecular weight ethylene polymers in admixture with paraffin waxes, particularly for the coating or waxing of paper and the like has not been practical because the high molecular weight solid ethylene polymers dissolve with difficulty in molten paraffin wax even at temperatures at 150° F.–160° F., normally used for waxing machine operations. While the solid ethylene polymers in melted condition are miscible with paraffins in all proportions, they tend to crystallize from solution at temperatures below about 230° F.

It is an object of the present invention to provide stable homogeneous wax compositions containing high molecular weight ethylene polymers. Another object of the invention is to provide a high tensile strength, stable, homogeneous paraffin wax composition containing high molecular weight ethylene polymers suitable for waxing paper.

Another object of the invention is to provide a method of rapidly bringing a high molecular weight ethylene polymer in solution in paraffin wax.

Other objects and advantages of the invention will become apparent from the following description thereof.

We have discovered that petroleum wax compositions containing high molecular weight ethylene polymers, which possess high tensile strength properties and which remain homogeneous, can be obtained by incorporating in the wax very small but sufficient amounts of the ethylene polymers to substantially increase the tensile strength of the wax but insufficient to have a substantial effect upon the cloud point of the wax. For example, we have found that these properties are attained by incorporating in the wax from about 0.001% to about 0.2% (by weight), and preferably from about 0.005% to about 0.05% (by weight) of ethylene polymers having average molecular weights of from about 5,000 to about 25,000, and preferably from about 10,000 to about 20,000. For certain uses where a slight haze or cloud is not objectionable we can use up to 1.0% of the ethylene polymer.

The high molecular weight solid ethylene polymers can be obtained by subjecting ethylene to pressures above 500 atmospheres and temperatures above about 100° C. The high pressure and temperature method of preparing high molecular weight ethylene polymers is described in detail in U. S. 2,153,553 issued to E. W. Fawcett et al. April 11, 1939. Another method of preparing high molecular weight ethylene polymers is described in U. S. 2,188,465 issued to M. W. Perrin et al. January 30, 1940.

The petroleum wax used can be a crystalline or paraffin wax or a micro-crystalline or amorphous wax such as a petrolatum wax having melting points of from about 140° F. to about 180° F. and preferably from about 145° F. to about 165° F. The petroleum waxes best adapted for use in the present invention are the crystalline or paraffin waxes having melting points of from about 125° F. to about 140° F., and preferably from about 130° F. to about 135° F.; such waxes are used for the coating or waxing of paper.

The high molecular weight ethylene polymers are dissolved with difficulty in molten petroleum waxes. We have discovered that the solution of such polymers in molten waxes can be greatly facilitated and accelerated by first forming a blend of the polymer containing from about 5% to about 60%, and preferably from about 20% to about 40% of the wax, preferably by milling at a temperature of from about 220° F. to about 360° F., and then dissolving the polymer-wax blend in the wax at a temperature of about 140° F. to about 250° F. Thus, a blend of 60% ethylene polymer and 40% paraffin wax of 132° F. melting point was brought into complete solution in about 40 minutes at 250° F., when the ethylene polymer was added in the form of a blend containing 10% of the wax, whereas the pure ethylene polymer could not be brought into solution in three hours at the same temperature, namely 250° F. The blend of ethylene polymer and wax can be prepared by stabilizing the ethylene polymer with a small amount of a stabilizer or anti-oxidant for example .02% sulfur and milling the paraffin wax into the polymer at about 270° F. Although the milled blend becomes opaque on cooling the mixture remains very intimate or homogeneous.

In another experiment a blend containing 0.1% of polyethylene of about 20,000 molecular weight and 99.9% of 132° melting point paraffin wax was made. This was done by dissolving 0.065 gram of a wax-polyethylene blend containing 0.050 gram of polyethylene in 50 grams of 132° melting point wax. The temperature was 225° F., and moderate stirring was employed. Complete solution was obtained in 15 minutes, whereas with 0.050 gram of pure polyethylene the time required for solution was 75 minutes.

The effect of the high molecular weight ethylene polymers on the cloud point of paraffin waxes is shown by the data in Table I. These data were obtained on a mixture of 132° F. melting point paraffin wax and ethylene polymer, prepared by dissolving at about 250° F. a blend of ethylene polymer of about 20,000 molecular weight and 10% paraffin wax of 132° F. melting point in additional paraffin wax, and determining the cloud point by alternately cooling and heating the blend until the temperature was established at which the cloud first became stable.

Table I

| | Cloud point, °F. |
|---|---|
| 100% ethylene polymer | 230 |
| 60% ethylene polymer 40% paraffin wax | 215 |
| 2% ethylene polymer 98% paraffin wax | 195 |
| 1% ethylene polymer 99% paraffin wax | 192 |
| 0.2% ethylene polymer 99.8% paraffin wax | 180 |
| 0.1% ethylene polymer 99.9% paraffin wax | [1]166 |
| 0.03% ethylene polymer 99.97% paraffin wax | 140 |
| 0.00% ethylene polymer 100.00% paraffin wax | 132 |

[1] Extrapolated.

The increase in tensile strength of petroleum wax imparted by very small amounts of the high molecular weight ethylene polymers is illustrated by the data in Table II. The tensile strength data were obtained on the Perkins tensile strength machine using a paraffin wax of 132° F. melting point and blends of this wax with 0.03%, 0.10% and 1.0% ethylene polymer of about 20,000 molecular weight.

Table II

| | Tensile strength |
|---|---|
| 100% 132° F. M. P. paraffin wax | 46 |
| 99.07% 132° F. M. P. paraffin wax+0.03% ethylene polymer | 62 |
| 99.9% 132° F. M. P. paraffin wax+0.10% ethylene polymer | 66 |
| 99.0% 132° F. M. P. paraffin wax+1.0% ethylene polymer | 97 |

Each of the above values is the average of five individual tests. The data show that the tensile strength of paraffin wax can be raised as much 35% by the addition of as little as 0.03% of the ethylene polymer without substantially affecting the cloud point of the wax. In addition to having improved tensile strength properties, paraffin waxes containing the herein named small amounts of high molecular weight ethylene polymers possess improved sealing characteristics. The ethylene polymer in such blends does not segregate on cooling and does not produce any mottled effects in the cold wax.

The percentages referred to herein and in the appended claims are weight percentages.

The wax compositions described herein can contain in addition to the high molecular weight ethylene polymers, opacifiers, anti-oxidants or other modifying agents.

While we have described our invention by reference to certain preferred embodiments thereof, the same is not limited thereto, except as defined by the appended claims.

We claim:

1. The method of preparing a high tensile strength petroleum wax composition containing an ethylene polymer having an average molecular weight of from about 5000 to about 25,000 comprising milling an ethylene polymer having an average molecular weight of about 5000 to about 25,000 with from about 5% to about 60% by weight of a petroleum wax at a temperature of from about 220° F. to about 360° F. to obtain a homogeneous blend of said petroleum wax and said polymer and then dissolving a sufficient amount of said blend in a petroleum wax at a temperature of from about 140° F. to about 250° F., to obtain a final wax composition containing from about 0.001% to about 0.2% by weight of said polymer.

2. The method of claim 1 wherein the petroleum wax is a paraffin wax.

3. The method of preparing a wax composition containing an ethylene polymer having an average molecular weight of from about 5000 to about 25,000; comprising milling an ethylene polymer having an average molecular weight of from about 5000 to about 25,000 with from about 5% to about 60% by weight of a petroleum wax at a temperature of from about 220° F. to about 360° F. to obtain a homogeneous blend of said petroleum wax and said polymer, and then dissolving said blend in petroleum wax at a temperature of from about 140° F. to about 250° F. to obtain a complete solution of the ethylene polymer in the petroleum wax.

4. The method of preparing a wax composition containing an ethylene polymer having an average molecular weight of from about 5000 to about 25,000; comprising forming a homogenous blend of an ethylene polymer having an average molecular weight of from about 5000 to about 25,000 with from about 5% to about 60% by weight of a petroleum wax at a temperature of from about 220° F. to about 360° F., and then dissolving said blend in petroleum wax at a temperature of from about 140° F. to about 250° F. to obtain a complete solution of the ethylene polymer in the petroleum wax.

FREDERICK H. MacLAREN.
JOHN A. ANDERSON.

REFERENCES CITED

The following references are of record in the file of this patent:

UNITED STATES PATENTS

| Number | Name | Date |
|---|---|---|
| 2,229,356 | Wiezevich | Jan. 21, 1941 |
| 2,298,846 | Skooglund | Oct. 13, 1942 |